(12) United States Patent
Singh

(10) Patent No.: US 12,430,735 B2
(45) Date of Patent: Sep. 30, 2025

(54) METHODS AND SYSTEMS FOR EVALUATING BUILDINGS

(71) Applicant: Bank of America Corporation, Charlotte, NC (US)

(72) Inventor: Shailendra Singh, Maharashtra (IN)

(73) Assignee: Bank of America Corporation, Charlotte, NC (US)

(*) Notice: Subject to any disclaimer, the term of this patent is extended or adjusted under 35 U.S.C. 154(b) by 308 days.

(21) Appl. No.: 18/239,153

(22) Filed: Aug. 29, 2023

(65) Prior Publication Data

US 2025/0078232 A1 Mar. 6, 2025

(51) Int. Cl.
G06T 7/00 (2017.01)
G06Q 10/20 (2023.01)
G06Q 50/16 (2012.01)

(52) U.S. Cl.
CPC ............ *G06T 7/0002* (2013.01); *G06Q 10/20* (2013.01); *G06Q 50/16* (2013.01); *G06T 2207/20081* (2013.01); *G06T 2207/30184* (2013.01)

(58) Field of Classification Search
CPC ......... G06T 7/0002; G06T 2207/20081; G06T 2207/30184; G06Q 10/20; G06Q 50/16
USPC ....................................................... 382/100
See application file for complete search history.

(56) References Cited

U.S. PATENT DOCUMENTS 11,631,245 B2 4/2023 Verma et al.

OTHER PUBLICATIONS

Re Cecconi, Fulvio, Sebastiano Maltese, and Mario Claudio Dejaco. "Leveraging BIM for digital built environment asset management." Innovative Infrastructure Solutions 2.1 (2017): 14. (Year: 2017).*
Casini, Marco. "Extended reality for smart building operation and maintenance: A review." Energies 15.10 (2022): 3785. (Year: 2022).*
Heinonen, Hanna, Sanni Siltanen, and Petri Ahola. "Information design for small screens: Toward smart glass use in guidance for industrial maintenance." IEEE Transactions on Professional Communication 64.4 (2021): 407-426. (Year: 2021).*
Agapiou, Andrew, et al. "The development of a smart mobile app for building façade defects inspections." Journal of Civil Engineering and Architecture 16 (2022): 150-171. (Year: 2022).*

* cited by examiner

*Primary Examiner* — Jonathan S Lee
(74) *Attorney, Agent, or Firm* — Weiss & Arons LLP

(57) ABSTRACT

A method is provided herein for evaluating a physical building, utilizing an automated image capture apparatus, a spatial computing apparatus, a machine learning model, a blockchain network, and a computer processor, the method including capturing and analyzing images of the building, dividing the building into sections, identifying defective characteristic(s) in and assigning a status to each section, sharing the images and status identifiers with a remote user, the remote user reviewing the images and identifiers, and receiving feedback from the remote user. When a section lacks sufficient images to determine whether a defect is present, the section may be flagged, and a supplemental image(s) may be captured and provided by the remote user. When no additional images are needed, the section may be indicated as completed. Otherwise, the section may retain its flagged status, and the aforementioned steps may be repeated as necessary.

20 Claims, 6 Drawing Sheets

METHODS AND SYSTEMS FOR EVALUATING BUILDINGS

FIELD OF TECHNOLOGY

Aspects of the disclosure relate to methods and systems for evaluating structural integrity of buildings.

BACKGROUND OF THE DISCLOSURE

Property inspections and evaluations are often required for buildings. Entities considering purchasing or issuing a loan against a building or other structure require accurate information about the condition of structural integrity of the structure. Such evaluations may be subject to human error and subjective interpretations, leading to material errors in building value assessments. For example, an appraiser may miss one or two details that could alter the evaluation of the home, such as a wall crack, leak, uneven floorboards, narrow driveway, etc. Moreover, an assessor may be precluded from multiple visits to a building site, for reasons of practicality.

Improved methods for building assessment are needed.

SUMMARY OF THE DISCLOSURE

It is an object of this invention to automate building structural integrity evaluations.

It is a further object of this invention to reduce operator error in structural evaluations.

It is a further object of this invention to enable real-time quality checks during the preparation of building reports. It would be preferable to enable such checks while a user is physically present at the building site.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may perform an image analysis. The instructions, when executed by the computer processor, may run a machine learning model.

A method is provided herein for evaluating a physical building, in accordance with principles of the disclosure. The method may utilize an automated image capture apparatus. The apparatus may be configured to be facially mounted on an operator. An operator wearing the image capture apparatus may direct the method. The image capture apparatus may be activated by the gaze of the user. The terms operator and user may be used herein interchangeably.

The method may utilize a spatial computing apparatus. The spatial computing apparatus may work in conjunction with the image capture apparatus to capture images of a visual field of a user wearing the image capture apparatus. The images may be still images. The images may be a video feed. The images may be video clips.

The method may utilize a machine learning model.

The method may utilize a file-sharing platform. The file-sharing network may be a blockchain network. The file-sharing network may be a real-time file-sharing network.

The method may include capturing a plurality of images of the physical building. The capturing step may utilize the image capture apparatus in conjunction with the spatial computing apparatus.

The method may include analyzing the plurality of images. The analyzing step may utilize the computer processor.

The method may include identifying a first section and a second section of the physical building. The method may include designating a first section and a second section of the building. Each of the first and second sections may correspond to a structural feature of the building.

The method may include predicting whether the first and/or second section includes a defective characteristic.

The method may include generating a first status identifier for the first section and a second status identifier for the second section. The status identifiers may reflect whether the particular section is assessed to include a defective characteristic. The status identifiers may reflect whether the particular section is assessed to contain a defective characteristic. The status identifiers may indicate whether sufficient images of the particular section have been captured, to determine whether the section has a defective characteristic.

The method may include sharing the first and second images and the first and second status identifiers with a remote user via a file-sharing platform. The sharing process may utilize a processor. The sharing process may utilize a blockchain network.

The method may include the remote user reviewing the images and status identifiers shared on the file-sharing platform.

The method may include receiving feedback on the first and second sections from the remote user.

The feedback may include an indication of whether sufficient information has been obtained for each analyzed section.

Additional information may be assessed to be required when a section lacks sufficient images to provide a comprehensive view thereof. Additional information may be required when a section lacks images of sufficient quality to provide a comprehensive view thereof. Additional information may be required when a section is considered likely to contain a defective feature or characteristic. Additional information may be required when a different imaging modality is considered likely to confirm or deny the presence of a suspected defective feature in the section.

When additional information and/or images are assessed to be required for a section, the section may be flagged. The flag may instruct the on-site user to capture a supplemental image(s) of the flagged section, via the image capture apparatus. Supplemental feedback may then be provided by the remote user.

If the remote user indicates that no additional information and/or images are needed for the flagged section, the section may be indicated as completed.

If the remote user indicates that additional information and/or images are still needed for the flagged section, the section may retain its flagged status. The aforementioned steps, starting with capturing a (additional) supplemental image(s) of the flagged section, may be repeated as necessary until sufficient information and/or images of the section have been captured.

The method may include generating a report about the physical building. The method may include composing a report about the building. The method may include recommending a repair to the building. The method may include repairing a defect in the building.

The report may include an assessment of the structural integrity of the building. The report may assess the structural integrity of the first and second sections of the building. The report may assess the structural integrity of the all the identified sections of the building. The report may include the image(s) and status identifier(s) of each identified section of the building. The report may include text inputted from a voice feed of a user of the image capture apparatus. The voice feed may be captured using a microphone physically attached to the image capture apparatus.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
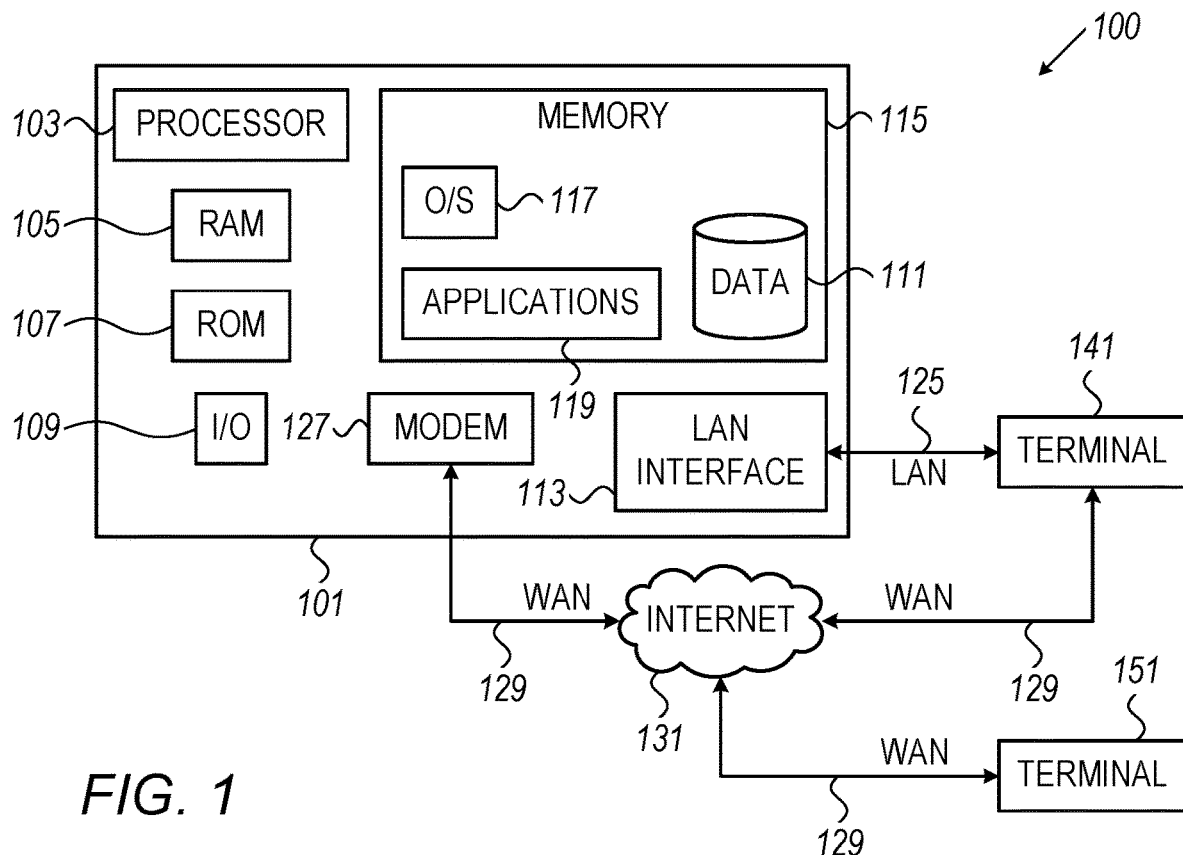
FIG. 1 shows an illustrative system in accordance with principles of the disclosure.

A method in accordance with principles of the disclosure may facilitate inspection and evaluation of structures, such as buildings.

Embodiments of the system, as described herein, leverage image capture and spatial computing technologies, generative machine learning models, blockchain networks or other file-sharing platforms, computer processors, and/or other complex, specific-use computer systems to provide a novel approach for evaluating the structural integrity of a building. The system may utilize processors, which may include machine learning models, to efficiently and accurately categorize a building into substructures and generate a report.

A method in accordance with principles of the disclosure may be implemented by a computer and/or be automated.

A method is provided herein for evaluating a physical building, in accordance with principles of the disclosure. The evaluation may assess the structural integrity of the building. The building may be a variety of structures, including a home, office space, logistic space, a warehouse, a commercial building, and an industrial plant.

The method may utilize an automated image capture apparatus. The term automated image capture apparatus, as used herein, may refer to the ability of the apparatus to capture a plurality of images following an optional single prompt. In some embodiments, the apparatus may require activation by a user prior to initiating automatic image capture. In some embodiments, the apparatus may be a camera. In some embodiments, the apparatus may be a video camera.

The apparatus may be configured to be facially mounted on an operator. An operator wearing the image capture apparatus may direct the method. The image capture apparatus may be activated by the gaze of the user. The terms operator and user may be used herein interchangeably.

The method may utilize a spatial computing apparatus. The spatial computing apparatus may work in conjunction with the image capture apparatus to capture images of a visual field of a user wearing the image capture apparatus. The images may be still images. The images may be a video feed. The images may be video clips.

The method may utilize a machine learning model.

The method may utilize a file-sharing platform. The file-sharing network may be a blockchain network. The file-sharing network may be a real-time file-sharing network.

The method may utilize a computer processor. The method may utilize one or more non-transitory computer-readable media storing computer executable instructions. The instructions, when executed by the computer processor, may perform an image analysis. The instructions, when executed by the computer processor, may run a machine learning model.

The method may include capturing a plurality of images of the physical building. The capturing step may utilize the image capture apparatus in conjunction with the spatial computing apparatus.

The method may include analyzing the plurality of images. This step may utilize the computer processor.

The method may include identifying a first section and a second section of the physical building. The method may include designating a first section and a second section of the building. Each of the first and second sections may correspond to a structural feature of the building. Each of the first and second sections may correspond to a portion of a structural feature of the building. The sections may be assigned successive numerical identifiers to unambiguously identify them in the report and documentation associated therewith. The sections may be assigned descriptive names (for example, "kitchen floor", "kitchen ceiling", "living room southern wall", and the like). The descriptive names may be assigned by a user of the image capture apparatus. The names may be captured using a voice feed.

There may be a plurality of second sections. For example, there may be 2 second sections (which may also be referred to as a second section and a third section), for a total of three sections. Similarly, there may be 3 second sections, 4 second sections, etc. It will be appreciated that the number of sections into which the building is partitioned may be commensurate with the size of the building and the number of structural features contained therein.

In some embodiments, the term "structural feature" does not necessarily imply an entire room or suite of rooms. The term may be intended to encompass any structural feature that warrants independent examination from an engineering perspective. Non-limiting examples of suitable structural features are the floor of a particular room, a section of the floor proximal to the window, the floor of an entire story of a building, the floor of the northern side of a story, the floor of a mezzanine level, the ceiling of a particular room, a section of the ceiling of a room proximal to a particular adjacent room, the ceiling of an entire story of a building, the ceiling of the northern side of a story, the ceiling of a mezzanine level, a wall of a particular room, an upper part of the wall, and an lower part of the wall.

The mentioned plurality of images may include at least one ("first") image of the first section and at least one ("second") image of the second section. In some embodiments, each image may delineate a section. In some embodiments, each image may capture part of a section. In some embodiments, each image may depict a representative portion of its section.

The method may include predicting whether each of the first and second sections includes a defective characteristic. The method may include predicting whether each of the first and second sections contains a defective characteristic. The predicting may utilize a machine learning model. The machine learning model may be a prediction algorithm. In some embodiments, the algorithm utilizes linear regression. In some embodiments, the algorithm utilizes predictive modeling. The training data may be data used to train the prediction algorithm. The training may include feeding the training data to a generic algorithm to compute the prediction algorithm. The prediction algorithm may be trained to identify a defective characteristic in an object. By way of example, when the defective characteristic is a crack in a wall, the prediction algorithm may be computed by feeding a generic algorithm with training data including a plurality of cracks in walls. This may generate the prediction model, primed to identify a crack in a wall.

The method may include generating a first status identifier for the first section and a second status identifier for the second section. The status identifiers may reflect whether the particular section is assessed to include a defective characteristic. The status identifiers may reflect whether the particular section is assessed to contain a defective characteristic. The status identifiers may indicate whether the existing images of the particular section are sufficient to determine whether the section has a defective characteristic.

The status identifier of a section may include an indication that the section includes a defective characteristic. The status identifier may include an indication that the section does not include a defective characteristic. The status identifier may include an indication that the section is defective. The status identifiers may include an indication that the section is not defective. The status identifiers designate an indeterminate status for the section. An indeterminate status designation in a draft report may cause the section to be flagged (for example, as described herein).

The defects that may be identified by the described methods and systems may include defects known in the art. Non-limiting examples are seepage, a cracked wall, a cracked window, damaged wallpaper, a damaged carpet, a leak in the ceiling, and uneven floorboards.

The method may include sharing the first and second images and the first and second status identifiers with a remote user via a file-sharing platform. The first image may be shared in association with the first status identifier. The second image may be shared in association with the second status identifier. The sharing may be in real time. Transmission to the remote user may take less than 2 minutes. Transmission to the remote user may take less than 5 minutes. The sharing process may be sufficiently rapid to enable a user of the image capture apparatus to receive feedback from a remote user (for example, as described hereinbelow) prior to concluding the building inspection. The sharing process may utilize a processor. The sharing process may utilize a blockchain network. The sharing process may utilize smart contract technology. The smart contract technology may be a technology described herein.

The method may include the remote user reviewing the images and status identifiers streamed to the file-sharing platform.

The method may include receiving feedback on the first and second sections from the remote user. The feedback may be received by a processor associated with the image capture apparatus. The feedback may be transmitted from the remote user to a processor associated with the image capture apparatus. The feedback may be received by an operator of the image capture apparatus. The feedback may be transmitted from the remote user to an operator of the image capture apparatus.

In some embodiments, the remote user is a building engineer. In some embodiments, the remote user is a trained building engineer. In some embodiments, the remote user is a property assessor. In some embodiments, the remote user is a trained property assessor.

The feedback may include an indication of whether sufficient information has been obtained for each analyzed section. The feedback may include an indication of whether additional information needs to be obtained for each analyzed section. The feedback may include an indication of whether additional images need be obtained for each analyzed section. The analyzed sections may be the mentioned first and second section. The analyzed sections may be all the sections identified in the building.

Additional information may be required when a section lacks sufficient images to provide a comprehensive view thereof. Additional information may be assessed to be required when a section lacks images of sufficient quality to provide a comprehensive view thereof. Additional information may be assessed to be required when a section is assessed as likely to contain a defective feature or characteristic. Additional information may be requested when a different imaging modality is considered likely to confirm or deny the presence of a suspected defective feature in a section.

The machine learning model may determine whether sufficient information has been obtained for each analyzed section. The model may determine whether additional information needs to be obtained for each analyzed section. The model may determine whether additional images should be obtained for each analyzed section. The analyzed sections may be the mentioned first and second sections. The analyzed sections may be all the sections identified in the building. The machine learning model may provide recommendations to the remote user, who reviews and approves or rejects them, before forwarding them to the operator of the image capture apparatus.

When additional information and/or images are assessed to be required for a section, the section may be flagged. The flag may be transmitted to a processor associated with the image capture apparatus. The flag may be displayed in a visually identifiable fashion to a user of the image capture apparatus. The flag may be displayed in a visually identifiable fashion to a wearer of the image capture apparatus. The flag may be displayed using an augmented reality apparatus.

The flag may instruct the image capture apparatus to capture a supplemental image(s) of the flagged section. The flag may instruct a user of the image capture apparatus to capture a supplemental image of the section. The flag may instruct a wearer of the image capture apparatus to capture a supplemental image of the section. The supplemental image(s) of each section may be intended to help determine whether the section has a defective characteristic. One or more supplemental images of the first section may be referred to as the first supplemental image of the first section, the second supplemental image of the first section, etc. Similar nomenclature may apply to supplemental images of the second section.

Once supplemental image(s) of the flagged section are captured, it/they may be shared with the remote user. The sharing process may utilize a blockchain network. The sharing process may utilize smart contract technology.

Supplemental feedback may then be provided by the remote user. The feedback may be transmitted to a processor associated with the image capture apparatus. The feedback may be displayed in a visually identifiable fashion to a user of the image capture apparatus.

If the remote user indicates that no additional information and/or images are needed for the flagged section, the section may be marked completed. An indication of such may be sent to a processor associated with the image capture apparatus. A flag associated with the section may be cleared. An indication may be sent to a processor associated with the image capture apparatus. An indication that no further images need be captured may be displayed in a visually identifiable fashion to a user of the image capture apparatus. The indication may be displayed using an augmented reality apparatus.

If the remote user indicates that additional information and/or images are still needed for the flagged section, the section may retain its flagged status. The aforementioned steps, starting with capturing a (additional) supplemental image(s) of the flagged section, may be repeated as necessary until sufficient information and/or images of the section are deemed to be captured.

In other embodiments, supplemental feedback may be provided by a machine learning model. The feedback may be transmitted to a processor associated with the image capture apparatus. The feedback may be displayed in a visually identifiable fashion to an on-site user.

If the model indicates that no additional information and/or images are needed for the flagged section, the section may be marked completed. An indication may be sent to a processor associated with the image capture apparatus. An indication that no further images need be captured may be displayed in a visually identifiable fashion to a user of the image capture apparatus.

If the model indicates that still further information and/or images are needed for the flagged section, the section may retain its flagged status. The aforementioned steps, starting with capturing a (additional) supplemental image(s) of the flagged section, may be repeated as necessary until sufficient information and/or images of the section have been captured.

The method may include generating a report about the physical building. The method may include composing a report about the building. The report may include an assessment of the structural integrity of the building. The report may include an assessment of the structural integrity of the first and second sections of the building. The report may assess the structural integrity of the all the identified sections of the building. The report may include the image(s) and status identifier(s) of each identified section of the building. The report may include text inputted from a voice feed of a user of the image capture apparatus. The voice feed may be captured using a microphone physically attached to the image capture apparatus.

The report may be finalize only after the image capture apparatus is assessed to have captured sufficient information on all the identified sections of the building. The report may be retained in draft form until sufficient information is considered to have been captured on all the identified sections of the building. The report may be retained in draft form until it is approved by the remote user. The report may be retained in draft form until it is approved by both the remote user and the operator of the image capture apparatus.

The report may include a recommendation to address a defective characteristic in the building. The report may include a recommendation to repair a defective characteristic in the building. The method may further include fixing a defective characteristic in the building. The method may further include repairing a defective characteristic in the building.

In some embodiments, certain steps may be performed by a human operator. In some embodiments, initial activation of the image capture apparatus may be performed by the operator. In some embodiments, activating the voice feed may be performed by the operator. In some embodiments, the operator initially suggests status identifiers. In some embodiments, section identification is performed by the operator. In some embodiments, one or more other steps described herein is performed by the operator.

In some embodiments, the building is partitioned into the first and second sections using a machine learning model. In some embodiments, the building is partitioned into all the identified sections using a machine learning model. The model may utilize contextual image classifying. The model may be a generative adversarial network (GAN).

The method may include executing an algorithm to identify structural features of the building. The object detection algorithm may be a Self-Attention Generative Adversarial Network ("SA GAN"). The object detection algorithm may detect the features. The algorithm may detect features having relevance to the appraiser's home inspection. Exemplary objects of relevance include a window, a door, a wall, and a roof. Objects that are not of relevance, and thus not detectable by the object detection algorithm, may include movable objects in the house such as a couch, bookshelf, bed, and a television.

In some embodiments, the building is partitioned into the first and second sections by a user of the image capture apparatus. In some embodiments, the building is partitioned into sections by a wearer of the image capture apparatus. In some embodiments, the building is partitioned into all the identified sections by a user of the image capture apparatus. In some embodiments, the building is partitioned into the identified sections by a wearer of the apparatus.

The mentioned report may further include supplemental image(s) of the first or second section. The report may include supplemental image(s) of any of the identified sections, in cases where supplemental image(s) were assessed to be required. The report may include supplemental image(s) of any of the identified sections, wherever supplemental image(s) were captured.

In some embodiments, the remote user may be requested to indicate whether additional sections of the physical building should be identified. In some embodiments, the remote user may be requested to indicate whether additional sections should be inspected. The indication may be requested prior to finalizing the report. The indication may be required in order to finalize the report. The indication may be requested by the processor prior to generating the report. The indication may be required in order to generate the report. The indication may be requested by the processor prior to completing the inspection. The indication may be required in order to complete the inspection. The indication may include a certification that the proposed section allocation is acceptable. The indication may include a certification that the proposed allocation is consistent with principles established by an entity overseeing the building evaluation. The indication may include a certification that the section allocation is consistent with these principles.

There may be minimal requirements of number and/or type of sections of a building that are analyzed. As a non-limiting example, it may be required to analyze at least the floor, ceiling, and each extant wall of each room in the building. In other embodiments, it may be required to analyze the floor, ceiling, and outer walls of each story of the building. It may be further required to analyze each wall of each room in the story.

In some embodiments, the machine learning model may be queried as to whether all required sections of the building have been identified. In some embodiments, the machine learning model may be queried as to whether additional sections of the building should be inspected. In some embodiments, the machine learning model may need to indicate whether additional sections of the building should be identified. In some embodiments, the model may need to indicate whether additional sections of the building should be inspected. A certification that all required sections have been inspected may be required before finalizing the draft report. A certification of such may be required before completing the inspection.

In some embodiments, the remote operator may be queried as to whether all required sections of the building have been identified. In some embodiments, the remote operator may be queried as to whether additional sections of the building should be inspected. In some embodiments, the remote operator may be required to indicate whether additional sections of the building should be identified. In some embodiments, the remote operator may be required to indicate whether additional sections of the building should be inspected. A certification that all required sections have been inspected may be required before finalizing the draft report. A certification of such may be required before completing the inspection.

In some embodiments, the method includes producing a voice feed. The voice feed may be produced by the operator of the image capture apparatus. The voice feed may be produced by the wearer of the image capture apparatus. The voice feed may be transmitted to the remote user. The voice feed may be received by the remote user. The voice feed may be incorporated into a draft report of the structural integrity of the building. The voice feed may be automatically transcribed using a transcription apparatus. The apparatus may send the transcript to a compiler to be incorporated into the draft report.

The voice feed may identify sections of the building. The voice feed may include notation of attributes of the building. The voice feed may include identification of predicted defective characteristics of a section(s). The voice feed may be linked to specific images and sections. The image or section to which a comment is linked may be automatically identified using the gaze of the operator, for example with the aid of the spatial computing apparatus.

A machine learning engine may identify sections of the building. The engine may perform annotation of attributes of the building. The engine may identify predicted defective characteristics of a section(s). The engine may be linked to specific images and sections. The image or section to which a comment is linked may be automatically identified using the gaze of the operator, for example with the aid of the spatial computing apparatus.

The method may also include verifying the location of the building that is assessed. The verification may utilize a geolocation apparatus. The apparatus may verify that the building being assessed is at the intended address. The apparatus may also verify the apartment number. The location may be incorporated into the report.

The method may also include apprising the operator of the image capture apparatus of a suspected defective characteristic. The method may include apprising the operator of the apparatus of a potential defective characteristic. The operator may be wearing the image capture apparatus. The machine learning algorithm may have identified the suspected defective characteristic. The suspected defect may have been identified by the remote operator. An augmented reality apparatus may be utilized to notify an on-site user. The apparatus may direct the user's gaze to the location of the suspected defect. The apparatus may generate an alert that appears on the augmented reality apparatus.

The method may also include displaying the first and second status identifiers to the operator. The method may also include overlaying the first and second status identifiers on the visual field of the operator. The method may also include displaying the status identifiers of each section to the operator. The display may utilize an augmented reality apparatus. The method may also include overlaying the status identifiers of each section on the operator's visual field. The method may include displaying the identifiers via an augmented reality apparatus. The apparatus may be configured to overlay the status identifiers on the operator's visual field. Each identifier may be associated with the relevant section.

In some embodiments, a generative machine learning algorithm automatically generates the report. In some embodiments, a generative machine learning algorithm automatically a draft of the report. The generative machine learning algorithm may be the previously mentioned machine learning algorithm. The algorithm may be a generative adversarial network (GAN).

The generative machine learning algorithm may be a different machine learning algorithm. The algorithm may be a deep learning algorithm. The algorithm may utilize a neural network. The neural network may include more than one layer. The neural network may include more than two layers. The network may be a long short-term memory neural network (LSTM). The network may be a traffic graph convolutional LSTM (TGC-LSTM). The network may have a transformer deep learning architecture. The architecture may utilize a parallel multi-head attention mechanism.

The algorithm may be supervised. The algorithm may be semi-supervised. The algorithm may be unsupervised. The algorithm may utilize a knowledge graph. The algorithm may utilize knowledge graph-augmented machine learning.

In some embodiments, a machine learning algorithm incorporates the images and identifiers of each section into the building report. In some embodiments, the algorithm uses the images and identifiers to generate a draft report. In some embodiments, the report generation is carried out section by section.

In some embodiments, the method includes reviewing the draft report. In some embodiments, the remote user performs the reviewing. In some embodiments, the remote user is given the opportunity to revise the draft report before it is finalized. In some embodiments, the remote user is given the opportunity to revise the draft report before it is sent to the on-site operator for additional review. The on-site operator may be given an opportunity to revise the draft report. The draft report may be based in part on the first and second images and the first and second status identifiers. The draft report may be based in part on the images and status identifiers of each section. The draft report may be further reviewed by a machine learning model.

In some embodiments, the draft report is shared with the remote user on a blockchain-based writing platform. In some embodiments, the writing platform is a blockchain network. The blockchain network may have, at least, a first node and a second node. The first node may be associated with the operator. The second node may be associated with a remote user. The second node may be viewable in real time by the remote user. The blockchain network may have at least a first node, a second node, and a third node. The third node may be associated with the machine learning model. The draft report may be saved on the blockchain network.

In some embodiments, the writing platform utilizes smart contract technology. Each node may register their profile in a registry and define share policies. Another user (forming another node) can request access to the document. A share-mediator may check the share policies associated with the document, create a shareable blob (Binary Large Object) service, and/or generate a share key. In some embodiments, a mediator may embed a share-policy token.

In some embodiments, the writing platform enables report validation by the remote user. In some embodiments, report validation is performed by a plurality of users, including at least one remote user. In some embodiments, report validation of each section is independently performed.

In some embodiments, the writing platform is a distributed ledger. In some embodiments, each participant (or node) in the network holds a copy of the master ledger. In some embodiments, the network is notified of any changes made by a participant to its copy of the draft report. In some embodiments, agreement by the all nodes in the network is required to enable stable changes to be made the document. In some embodiments, multiple competing versions of the document, or the ledger, are not allowed to stably coexist.

In some embodiments, the method includes an operator of the image capture apparatus reviewing the draft report. In some embodiments, a wearer of the apparatus performs the reviewing. In some embodiments, review by an on-site operator follows review by a remote user. In some embodiments, the remote user's review follows the on-site operator's review.

In some embodiments, the on-site operator reviews the draft report on the site of the building. In some embodiments, the reviewing is performed prior to leaving the site of the building. In some embodiments, the on-site operator generates a draft report jointly with the machine learning model, which is subsequently reviewed by the remote user. In some embodiments, the machine learning model generates a draft report, which is then reviewed by the on-site operator, after which the report is reviewed by the remote user. Each user or operator may be allowed to propose changes to the draft report. The changes may be shared on the file-sharing platform. The draft report may be based in part on the first and second images and the first and second status identifiers. The draft report may be based in part on the images and status identifiers of each section. The draft report may be further reviewed by a machine learning model.

In some embodiments, the method includes reviewing the draft report by a machine learning model. In some embodiments, the model is given the opportunity to revise the draft report before it is finalized. In some embodiments, the model can revise the draft report before it is sent to the on-site operator for additional review. The draft report may be based in part on the first and second images and the first and second status identifiers. The draft report may be based in part on the images and status identifiers of each section.

In some embodiments, the draft report is shared with the machine learning model on a blockchain-based writing platform. In some embodiments, the writing platform is a blockchain network. The blockchain network may have, at least, a first node and a second node. The first node may be associated with the operator. The second node may be associated with a machine learning model. The second node may be viewable in real time by the model.

In some embodiments, the described method includes prompting the operator of the image capture apparatus to capture an image of a building section. In some embodiments, the operator is prompted before any images of the section have been captured. In some embodiments, the operator is prompted when insufficient images of the section have been captured. In some embodiments, the prompt originates from the remote user. In some embodiments, the prompt originates from the machine learning model.

The image capture apparatus may include smart glasses. For the purposes of this disclosure, a smart glasses device, referred to alternately herein as "smart glasses," may be understood to mean wearable glasses including one or more internal processors. The one or more internal processors may include one or more microprocessors. In addition to the processors, the smart glasses may also include hardware components associated with conventional glasses. Such components may include a frame and lenses.

Other components of the smart glasses may include one or more displays, one or more cameras, one or more video cameras, one or more audio input devices, one or more audio output devices and/or one or more wired and/or wireless communication modules.

One or more software modules may execute on the processors. The one or more software modules may be stored in a memory located within the smart glasses. The one or more software modules may, in the alternative, be referred to as applications. The applications may enable the smart glasses to execute various tasks. Exemplary applications may include object recognition and running prediction models, as detailed below.

The display may show information alongside what the user sees through the lenses. The smart glasses display may be physically configured to add data alongside what the wearer sees. In some embodiments, the smart glasses display may display data as an at least partially transparent overlay on top of the lenses. In some embodiments, the overlay may not be transparent. As such, the user may view, through the overlay, physical objects that are normally seen through lenses in addition to the overlay. Such a smart glasses display may be known as augmented realty.

The smart glasses may have the ability to modify its optical properties, such as tint and prescription of the lenses. The optical property modification may be executed at any given time. Smart glasses may change optical properties of the lenses by executing one or more software modules on the internal processors.

Various sensors may be included in the smart glasses. These sensors may include a GPS, a moisture sensor, a voltage meter, an accelerometer, a gyroscope, a touch pad, and any other suitable sensors.

The smart glasses may include a nano wireless network interface card. The nano wireless network interface card may establish communication with a wireless network. The nano wireless network interface card may be operable to transmit a data packet over the wireless network. The data packet may be transferred to a remote server.

The smart glasses may include a battery. The battery may be operable to power hardware components embedded in the smart glasses, such as the video camera, the microprocessor, the display, and the nano wireless network interface card.

The smart glasses device may execute a prediction model on video data captured by the video camera. The smart glasses may retrain the prediction model in response to a data synchronization between an output of the prediction model and a gesture captured by the smart glasses device. The gesture may be captured in the video data.

The smart glasses may include the video camera. The video camera may be operable to record a video including frames. The frames may include a first frame and a plurality of second frames.

The smart glasses may include a database. The database may store the prediction model and training data. The prediction model may be a prediction algorithm.

The smart glasses may include the microprocessor. The microprocessor may be operable to receive the first frame from the video camera and to process the first frame. The processing may include executing an object detection algorithm on the first frame to detect the object in the first frame. The object detection algorithm may be an "SA GAN". The object detection algorithm may detect the object. When the smart glasses device is being used by an appraiser to inspect a house, the object detection algorithm may detect objects having relevance to the appraiser's home inspection. Exemplary objects of relevance include a window, a door, a wall, a roof. Objects not of relevance and not detectable by the detection algorithm may include movable objects.

The processing described herein of the first frame may be repeated for some or all frames captured by the video camera. For each frame processed, a plurality of frames captured after the frame may be analyzed to determine if they include a gesture as described herein.

The object detection algorithm may identify the object in the first frame. When the object detection algorithm identifies a plurality of objects, the algorithm may identify one or more objects in the frame. The algorithm may also identify a boundary circumscribing the object in the first frame. The algorithm may associate the object with an object identifier. The identifier may be associated with the object in the database.

When the object detection algorithm identifies the object in the first frame, the microprocessor may run the prediction model on the first frame. Running the prediction model on the object may determine if the object includes a defective characteristic. Exemplary defective characteristics may include seepage, cracked wall, narrow parking, damaged wallpaper, damaged carpet, etc.

In illustrative embodiments, the object may be a wall, the defective characteristic may be a crack in the wall, and the training data may a plurality of images of walls with and without cracks.

The prediction model may identify a single defective characteristic. In some of these embodiments, the database may include a plurality of prediction models, each prediction model being associated with one or more object identifiers. Running the prediction model on the object may include pulling one or more prediction models associated with the object identifier of the object and running the pulled models on the object.

The prediction model may identify two or more defective characteristics.

The prediction model may not identify a defective characteristic. When a defective characteristic is not identified, no action may be taken by the microprocessor.

When the prediction model is run on a frame that includes two or more identified objects, the running the prediction model may include retrieving all prediction models tagged with the object identifiers associated with the two or more identified objects.

In some embodiments, the frame may not be processed by the object detection algorithm. Instead, the frame may be fed directly to the prediction model for identification of one or more defective characteristics.

The object detection algorithm may detect a plurality of objects, the plurality of objects including the object. The processing of the object described herein may be applied to two or more objects. Each of the objects may be associated with an object identifier.

When the defective characteristic is identified by the prediction model, the prediction model may output a classifier associated with the defective characteristic. The classifier may be referred to alternately herein as a defect classifier. In some embodiments, the classifier may be natural language describing the defect, for example, "cracked wall" or "broken roof."

When the defective characteristic is identified by the prediction model, the prediction model may instruct the display to trigger an augmented reality display to a user of smart glasses or another image capture apparatus.

In response to the trigger, the display may generate the augmented reality display. The augmented reality display may circumscribe the object with a boundary. The boundary may be any suitable color. The augmented reality display may position the natural language associated with the defective classifier adjacent to the boundary.

After triggering the augmented reality display, the microprocessor may search the plurality of second frames for a gesture indicating the data synchronization. The plurality of frames may be frames captured within a time span after the augmented reality display is generated. Exemplary time spans may include 30 seconds, 1 minute, 2 minutes and 3 minutes. The gesture may include body movements of the image capture apparatus's user or wearer. Exemplary body movements include the waving of a hand, movement of a foot, movement of an arm, positioning one or two hands into a predefined shape, or any other suitable body movement.

In some embodiments, in place of a gesture, the user may input an audio command into a microphone attached to smart glasses. When the microprocessor identifies the audio command and within a time span after the augmented reality display is generated, data synchronization may be confirmed. Exemplary audio commands may include one or more of "yes", "that's right", "correct", or any other suitable audio command.

For the purposes of the application, data synchronization may be a confirmation of an accuracy of the prediction output by the image capture apparatus user. In some embodiments, data synchronization may occur when the body movements are captured within the time span. In some embodiments, data synchronization may occur when the audio command is captured within the time span.

In response to identifying the gesture, the microprocessor may compile a data packet for transfer to a remove server via an internet connection. The data packet may include one or more of the first frame, the boundary overlaid on the object in the first frame, a time at which the video camera captured the first frame, the classifier and the object identifier. In some embodiments, the data packet may store the first frame in read-only mode.

In response to the data synchronization, as described above, the microprocessor may update the training data in the database to include the first frame. Updating the training data may create new training data based on an identifying gesture in the plurality of second frames. The new training data may include the previously stored training data and the first frame.

In response to the data synchronization, as described above, the microprocessor may update the training data in the database to include the object. The object may be extracted from the first frame by applying the boundary to the first frame and extracting the pixels within the boundary. The new training data may include the previously stored training data and the object.

The processing may identify the object and a boundary circumscribing the object in the first frame using the object detection algorithm. The microprocessor may compile a data packet for transfer to the central hub via the internet connection. The data packet may include the first frame, a tag tagged to the first frame identifying the object, and a time at which the video camera captured the first frame. The tag may include the object identifier.

The central hub may store the prediction model and the training data in a database. The prediction model may be primed to identify a defective characteristic in the object. The prediction model may be associated with the tag.

Upon receipt of the first frame, the central hub may extract the tag from the first frame and search a database storing a plurality of prediction models for the prediction model associated with the tag. Upon identification of the prediction model associated with the tag, the central hub may run the prediction model on the first frame. When the prediction model identifies the defective characteristic, the central hub may receive an output from the prediction model that identifies the defective characteristic in the object and a classifier associated with the defective characteristic. When the prediction model does not identify the defective characteristic, no output may be generated.

After receipt of the output, the central hub may transmit to the image capture apparatus an instruction to trigger an augmented reality display to the user. The instruction may be compiled in a second data packet. In some embodiments, the second data packet may also include the classifier.

In response to receipt of the instruction from the central hub, the image capture apparatus may display the augmented reality display to the user. The augmented reality display may overlay the boundary on the object. When the classifier is included in the second data packet, the display may also position natural language associated with the classifier adjacent to the boundary in the augmented reality display.

In some embodiments, the image capture apparatus's user may trigger the video camera to start recording when he enters a building to perform an appraisal review on the building. The trigger may be the depression of a button on the apparatus, an audio command, or a gesture. The user may then terminate the video recording when the appraisal has been completed by a second trigger. During the video recording, some or all of the frames captured by the video camera may be processed as the first frame is processed, for example as described herein.

In some embodiments, the video may be stored on the image capture apparatus. Each time a defective characteristic is identified by the systems and methods described herein, the apparatus may tag the video with a time at which the defective characteristic was identified, and, in some embodiments, natural language text that describes the defective characteristic. When the video has finished recording, the image capture apparatus may transmit the video with the tags to the remote server. In some embodiments, each frame that was identified to have one or more defective characteristics may also be compiled and sent to the remote server when the video has finished recording. Text may be included in the transmission, such as "Seepage at 1:21, Cracked Wall at 2:35, Damaged Carpet at 4:53." A compilation of images, or frames, each image or frame including a defective characteristic, may also be included in the transmission.

In some embodiments, a video feed may be streamed to a remote server. The remote server may process the data and tag the video with the times at which defective characteristics were identified by the remote server using systems and methods described herein.

In some embodiments, the tagged video may be appended to an electronic mortgage application. In some embodiments, the frames in which defective characteristics were identified may be appended to a mortgage application.

In some embodiments, each defective characteristic may be associated with a depreciation value at a remote server database. When the recording of the video is complete, the depreciation values may be applied to a value of a house featured in the video. Each defective characteristic may be associated with a unique depreciation value. For example, a cracked window may result in a $500 reduction in price and a damaged roof in a $5000 depreciation.

The remote server may identify the house featured in the video by retrieving GPS data captured by the image capture apparatus during the recording of the video. The GPS data may include sets of coordinates. The remote server may identify a home address located at the sets of coordinates included in the GPS data.

In some embodiments, the described report generation is synchronous with the image capture. In some embodiments, the smart glasses or other image capture apparatus automatically assigns attribute(s) to each section, based on image classification. A generative AI engine may automatically generate a draft report, incorporating the images and assessed attributes of each section. A remote user may review and approve or reject each section in real time.

In some embodiments, the described report generation is asynchronous with the image capture. The on-site user of the image capture apparatus may capture images of and describe the attributes of each section. A generative AI engine may automatically generate a draft report, incorporating the images and assessed attributes of each section. A remote user may review and approve or reject each section. Such a review may occur during or after the user of the image capture apparatus has departed from the site. If necessary, the on-site user may subsequently return to the site, to capture additional images and/or other information for building sections assessed to lack sufficient information.

In some embodiments, the described method includes assessing a characteristic of the building via a remote sensing method. In some embodiments, the remote sensing is prompted by the on-site user. In some embodiments, the sensing is prompted by the remote user. In some embodiments, the sensing is prompted by the machine learning model. In some embodiments, the method is performed on a section(s) of the building suspected to possess a defective characteristic.

In some embodiments, the remote sensing method is Light Detection and Ranging (LIDAR). In some embodiments, LIDAR is used to measure the distance to an obstacle. In some embodiments, the remote sensing method is radar. In some embodiments, the method is sonar. In some embodiments, the method is infra-red imaging. In some embodiments, the method is middle-wave infrared (MWIR) sensing. In some embodiments, the method is long-wave infrared (LWIR) sensing. In some embodiments, the method is a combination of sonar and infra-red imaging. In some embodiments, the method is selected from the group consisting of LIDAR, radar, sonar, infra-red imaging, and a combination of sonar and infra-red imaging.

Data, text, and/or images generated from the described methods and systems may be incorporated into an evaluation report template. The template may include standardized or predetermined report components. Images from each section may be automatically incorporated into the template for that section. Text from each section may be automatically incorporated into the template for that section.

The augmented reality screen may display sections in a color-coded fashion that reflects the status of each section. The color coding may reflect whether the report for each section is considered complete.

A system is provided herein for evaluating a physical building, in accordance with principles of the disclosure. The evaluation may assess the structural integrity of the building.

The system may include an automated image capture apparatus. The apparatus may be configured to be facially mounted on an operator. An operator wearing the image capture apparatus may direct the method. The image capture apparatus may be activated by the gaze of the user. The terms operator and user may be used herein interchangeably.

The system may include a spatial computing apparatus. The spatial computing apparatus may be configured to work in conjunction with the image capture apparatus to capture images of a visual field of a user wearing the image capture apparatus. The images may be still images. The images may be a video feed. The images may be video clips.

The system may include a machine learning model. The system may include a file-sharing platform. The file-sharing network may be a blockchain network. The file-sharing network may be a real-time file-sharing network.

The system may include a computer processor. The system may include one or more non-transitory computer-readable media storing computer executable instructions. The instructions, when executed by the computer processor, may perform an image analysis. The instructions, when executed by the computer processor, may be configured to run a machine learning model.

The system may be configured to capture a plurality of images of the physical building. The capturing step may utilize the image capture apparatus in conjunction with the spatial computing apparatus.

The system may be configured to analyze the plurality of images. This step may utilize the computer processor.

The system may be configured to identify a first section and a second section of the physical building. Each of the first and second sections may correspond to a structural feature of the building. Each of the first and second sections may correspond to a portion of a structural feature of the building.

The system may be configured to predict whether each of the first and second sections includes a defective characteristic. The predicting may utilize a machine learning model. The machine learning model may be a prediction algorithm.

The system may be configured to generate a first status identifier for the first section and a second status identifier for the second section. The status identifiers may reflect whether the particular section is assessed to include a defective characteristic. The status identifiers may reflect whether the particular section is assessed to contain a defective characteristic. The status identifiers may indicate whether sufficient images of the particular section have been captured, to determine whether the section has a defective characteristic.

The status identifier of a section may include an indication that the section includes a defective characteristic. The status identifier may include an indication that the section does not include a defective characteristic. The status identifier may include an indication that the section is defective. The status identifiers may include an indication that the section is not defective. The status identifiers may include an indication that the section is of indeterminate status. An indeterminate status designation may cause the section to be flagged (for example, as described herein).

The system may be configured to share the first and second images and the first and second status identifiers with a remote user via a file-sharing platform. The first image may be shared in association with the first status identifier. The second image may be shared in association with the second status identifier.

The system may be configured to enabled the remote user to review the images and status identifiers shared on the file-sharing platform.

The system may be configured to receive feedback on the first and second sections from the remote user. The feedback may be received by a processor associated with the image capture apparatus. The feedback may be transmitted from the remote user to a processor associated with the image capture apparatus. The feedback may be received by an operator of the image capture apparatus. The feedback may be transmitted from the remote user to an operator of the image capture apparatus.

The feedback may include an indication of whether sufficient information has been obtained for each analyzed section. The feedback may include an indication of whether additional information needs to be obtained for each analyzed section. The feedback may include an indication of whether additional images need be obtained for each analyzed section. The analyzed sections may be the mentioned first and second section. The analyzed sections may be all the sections identified in the building.

Additional information may be assessed to be required when a section lacks sufficient images to provide a comprehensive view thereof.

The machine learning model may be configured to determine whether sufficient information has been obtained for each analyzed section. The machine learning model may be configured to provide recommendations to the remote user, who reviews and approves or rejects them, before forwarding them to the operator of the image capture apparatus.

When additional information and/or images are assessed to be required for a section, the system may be configured to flag the section. The flag may be transmitted to a processor associated with the image capture apparatus. The flag may be displayed in a visually identifiable fashion to a user of the image capture apparatus. The flag may be displayed in a visually identifiable fashion to a wearer of the image capture apparatus. The flag may be displayed to a user of the image capture apparatus using an augmented reality apparatus.

The flag may instruct the image capture apparatus to capture a supplemental image(s) of the flagged section.

Once supplemental image(s) of the flagged section are captured, it/they may be shared with the remote user. The system may include a blockchain network configured for enabling the sharing process. The sharing process may utilize smart contract technology.

The system may be configured to enable the remote user to provide supplemental feedback. The feedback may be transmitted to a processor associated with the image capture apparatus. The feedback may be displayed in a visually identifiable fashion to a user of the image capture apparatus.

Once the remote user indicates that no additional information and/or images are needed for the flagged section, the system may be configured to mark the section completed. An indication of such may be sent to a processor associated with the image capture apparatus. A flag associated with the section may be cleared. An indication of such may be sent to a processor associated with the image capture apparatus. An indication that no further images need be captured may be displayed in a visually identifiable fashion to a user of the image capture apparatus. The indication may be displayed using an augmented reality apparatus.

If the remote user indicates that additional information and/or images are still needed for the flagged section, the section may retain its flagged status. The aforementioned steps, starting with capturing a (additional) supplemental image(s) of the flagged section, may be repeated as necessary until sufficient information and/or images of the section have been captured.

The system may be configured to enable a machine learning model to provide supplemental feedback. The feedback may be transmitted to a processor associated with the image capture apparatus. The feedback may be displayed in a visually identifiable fashion to a user of the image capture apparatus.

If the model indicates that no additional information and/or images are needed for the flagged section, the section may be indicated as completed. An indication of such may be sent to a processor associated with the image capture apparatus. An indication that no further images need be captured may be displayed in a visually identifiable fashion to a user of the image capture apparatus.

If the model indicates that additional information and/or images are still needed for the flagged section, the section may retain its flagged status. The aforementioned steps, starting with capturing a (additional) supplemental image(s) of the flagged section, may be repeated as necessary until sufficient information and/or images of the section have been captured.

The system may be configured to generate a report about the physical building. The report may include an assessment of the structural integrity of the building. The report may include an assessment of the structural integrity of the first and second sections of the building. The report may include an assessment of the structural integrity of the all the identified sections of the building. The report may include the image(s) and status identifier(s) of each identified section of the building. The system may include a voice feed capture apparatus to enable text to be inputted by a user of the image capture apparatus. The voice feed may be captured using a microphone physically attached to the image capture apparatus.

The system may be configured to generate the report only after the image capture apparatus is assessed to have captured sufficient information on all the identified sections of the building. The report may be retained in draft form until the image capture apparatus is assessed to have captured sufficient information on all the identified sections of the building. The report may be retained in draft form until it is approved by the remote user. The report may be retained in draft form until it is approved by both the remote user and the operator of the image capture apparatus.

The report may include a recommendation to address a defective characteristic in the building. The report may include a recommendation to repair a defective characteristic in the building. The method may further include fixing a defective characteristic in the building.

The system may be configured to obtain input from the remote user regarding whether additional sections of the physical building should be identified. The indication may be requested prior to finalizing the report. The indication may include a certification that the section allocation is consistent with principles established by an entity that requested an inspection of the building.

The system may be configured to obtain input from the machine learning model regarding whether all required sections of the building have been identified. In some embodiments, the machine learning model may be required to indicate whether additional sections of the physical building should be identified. A certification that all required sections have been inspected may be required before completing the draft report. A certification of such may be required before completing the inspection.

The system may be configured to obtain input from the remote operator regarding whether all required sections of the building have been identified.

The system may be configured to verify the location of the building that is assessed. The system may include a geolocation apparatus configured for such purposes. The apparatus may verify that the building being assessed is at the intended address. The apparatus may also verify the apartment number. The location may be incorporated into the report.

The system may be configured to apprise the operator of the image capture apparatus of a suspected defective characteristic. The operator may be wearing the image capture apparatus. The suspected defective characteristic may have been identified by the machine learning algorithm. The suspected defective characteristic may have been identified by the remote operator. Notification of an on-site user may utilize an augmented reality apparatus. The apparatus may direct the user's gaze to the location of the suspected defect. The apparatus may generate an alert that appears on the augmented reality apparatus.

The system may be configured to display the first and second status identifiers to the operator. The display may utilize an augmented reality apparatus. The method may include displaying the identifiers with the aid of an augmented reality apparatus. The apparatus may be configured to overlay the status identifiers on the visual field of the operator. Each identifier may be associated with the relevant section.

The system may be configured to enable the remote user to review the draft report. In some embodiments, the remote user is given the opportunity to revise the draft report before it is finalized. In some embodiments, the remote user is given the opportunity to revise the draft report before it is sent to the on-site operator for additional review. The draft report may be based in part on the first and second images and the first and second status identifiers. The draft report may be based in part on the images and status identifiers of each section. The draft report may be further reviewed by a machine learning model.

The system may include a blockchain-based writing platform configured for sharing the draft report with the remote user. The blockchain network may have a first node and a second node. The first node may be associated with the operator. The second node may be associated with a remote user. The second node may be viewable in real time by the remote user. The blockchain network may have at least a first node, a second node, and a third node. The third node may be associated with the machine learning model.

In some embodiments, the writing platform utilizes smart contract technology.

In some embodiments, the writing platform enables report validation by the remote user. In some embodiments, report validation is performed by a plurality of users, including at least one remote user. In some embodiments, report validation of each section is independently performed.

Smart glasses and/or image capture apparatus 302 may have one or more features in common with the smart glasses described herein.

The aforementioned processing device or computer processor may be a computer, as described in more detail in FIG. 1, optionally including any of the components and elements described for FIG. 1.

Figure 2:
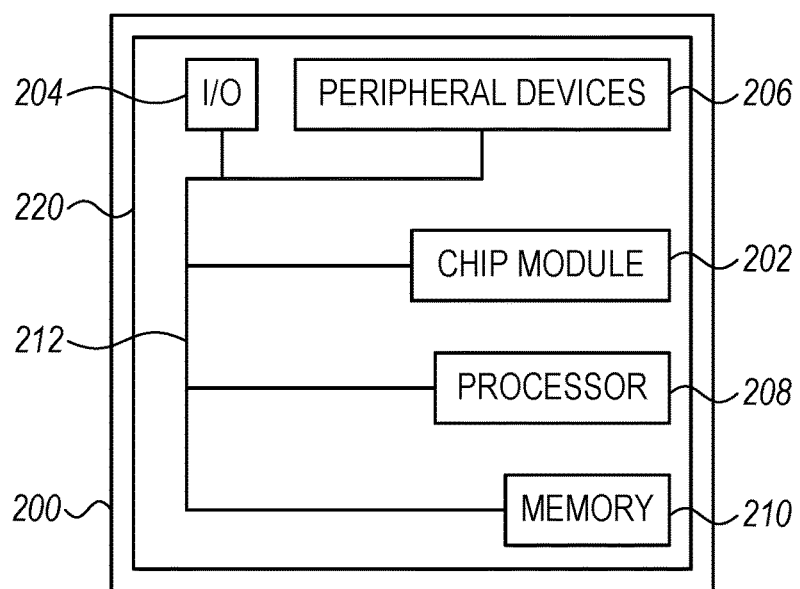
FIG. 2 shows an illustrative system in accordance with principles of the disclosure.

In some aspects, the processing device or computer processor may be a computer, as described in more detail in FIG. 2, optionally including any of the components and elements described for FIG. 2.

Apparatus and methods described herein are illustrative. Apparatuses and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

The smart glasses may comprise one or more computer systems and servers that include one or more of the following hardware components: Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks, for example processing voice feeds, capturing and processing images, augmented reality displays, and draft report generation.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions, such as image processing, contextual image classifying, and report generation.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines, for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
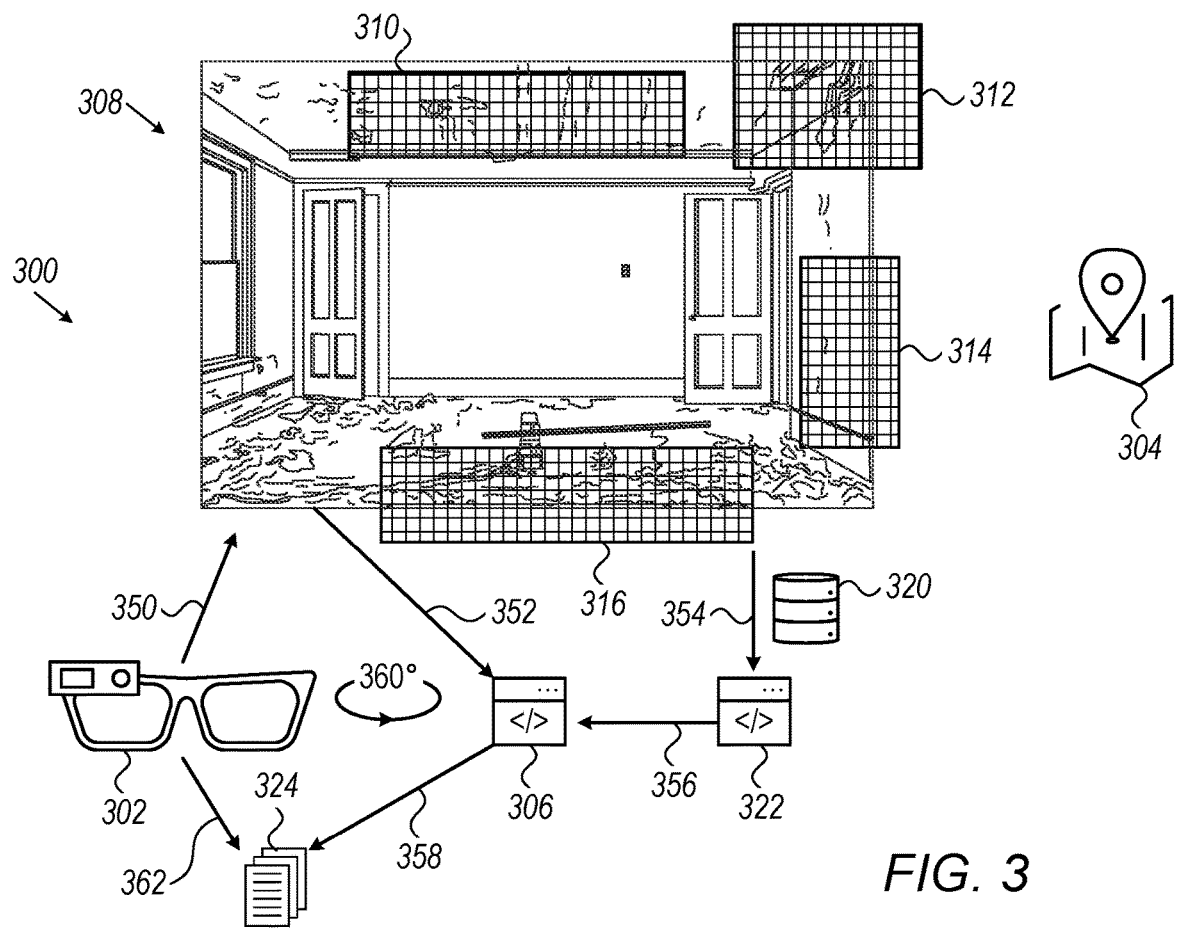
FIG. 3 is a diagram of an apparatus for property evaluation.

FIG. 3 provides a diagram of an apparatus for property evaluation, in accordance with principles of the disclosure. The apparatus of system 300 may include eye-tracking smart glasses 302 and geolocation apparatus 304, generative machine learning-based property report generation module 306, and contextual image classifying module 322. Smart glasses 302 may include a spatial computing apparatus, an augmented reality apparatus, and a geolocation apparatus.

At step 350, user may enter physical building (not shown) and swivel smart glasses 302 to capture images of room 308 of physical building. Geolocation apparatus 304 may be optionally used to confirm the expected location of physical building.

Swiveling may be panoramic (360 degrees). User or machine learning model may divide room 308 into sections and capture images 310, 312, 314, and 316. There may be at least one image from each section. User or machine learning model may identify attributes of sections, based at least in part on images 310, 312, 314, and 316, and affix labels accordingly to sections.

At step 352, smart glasses may feed section allocation and attributes to property report generation module 306.

At step 354, smart glasses may feed image files 320 to contextual image classifying module 322.

At step 356, classifying module 322 may classify image files 320 to identify potential defective features and transmit this information to property report generation module 306.

At step 358, property report generation module 306 may generate report 324.

At step 362, generative artificial intelligence (AI) or machine learning may create report based on feed from spatial computing device.

Figure 4:
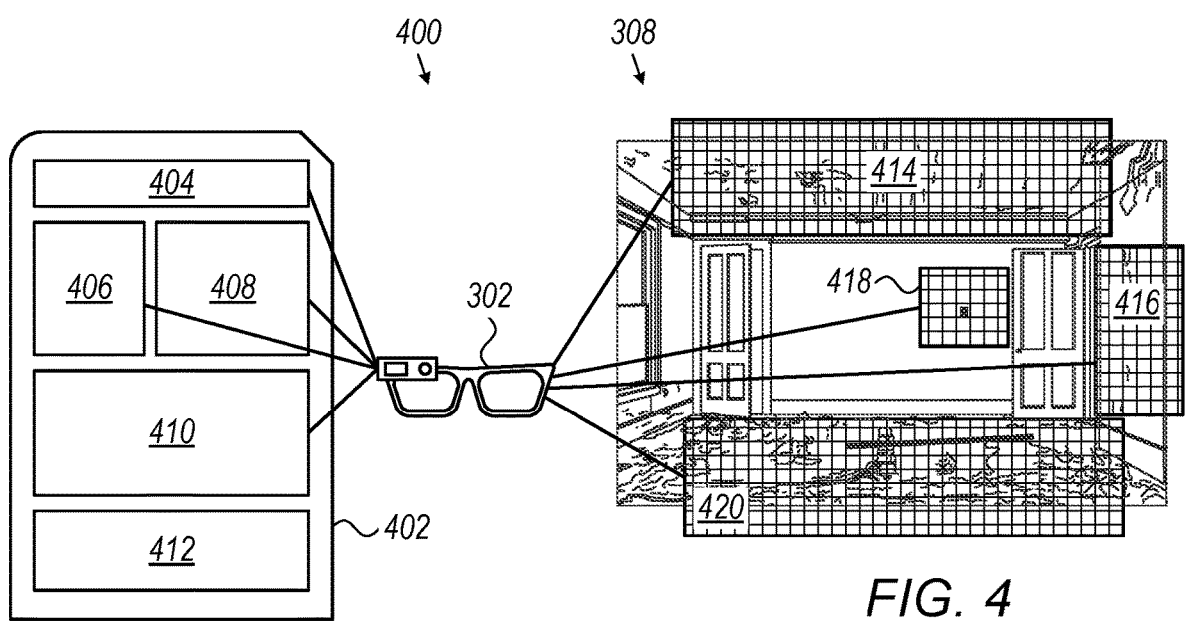
FIG. 4 is a mapping scheme of room sections to report components.

FIG. 4 depicts mapping scheme 400 of room sections to components of evaluation report template 402, in accordance with principles of the disclosure. Images 414, 416, 418, and 420 of each section of room 308 may be identified by smart glasses 302 and/or image capture apparatus 302. Each section may be automatically mapped to one or more of report components 404, 406, 408, 410, and 412. Solely for exemplification, image 414 may map to section 404 of the report, relating to the structural integrity of the ceiling of the identified space; images 416 and 418 may map to sections 406 and 408 of the report, relating to the structural integrity of individual walls of the identified space; and image 420 may map to section 410 of the report, relating to the structural integrity of the floor of the identified space. The report components may be standardized or predetermined components of evaluation report template 402. Images may be automatically incorporated into the template for each section.

A machine learning model may automatically classify images 414, 416, 418, and 420. The model may automatically recommend section assignments to the images. The model may automatically assess the structural integrity of each section. The assessments may be subject to review of the on-site user. The assessments may be subject to the review of the remote user.

The machine learning model may automatically assess whether sufficient images of each section have been captured. The assessments may be subject to review of the on-site user. The assessments may be subject to the review of the remote user.

The model may map a real-time feed from augmented reality and geolocation spatial computing data to evaluation report template 402. The model may generate and/or compose the report content for each section of the report, based on the voice feed and spatial computing data feed. The model may be a generative AI model. Each section of the report may be validated in real time by a smart contract linked to a blockchain network.

Figure 5:
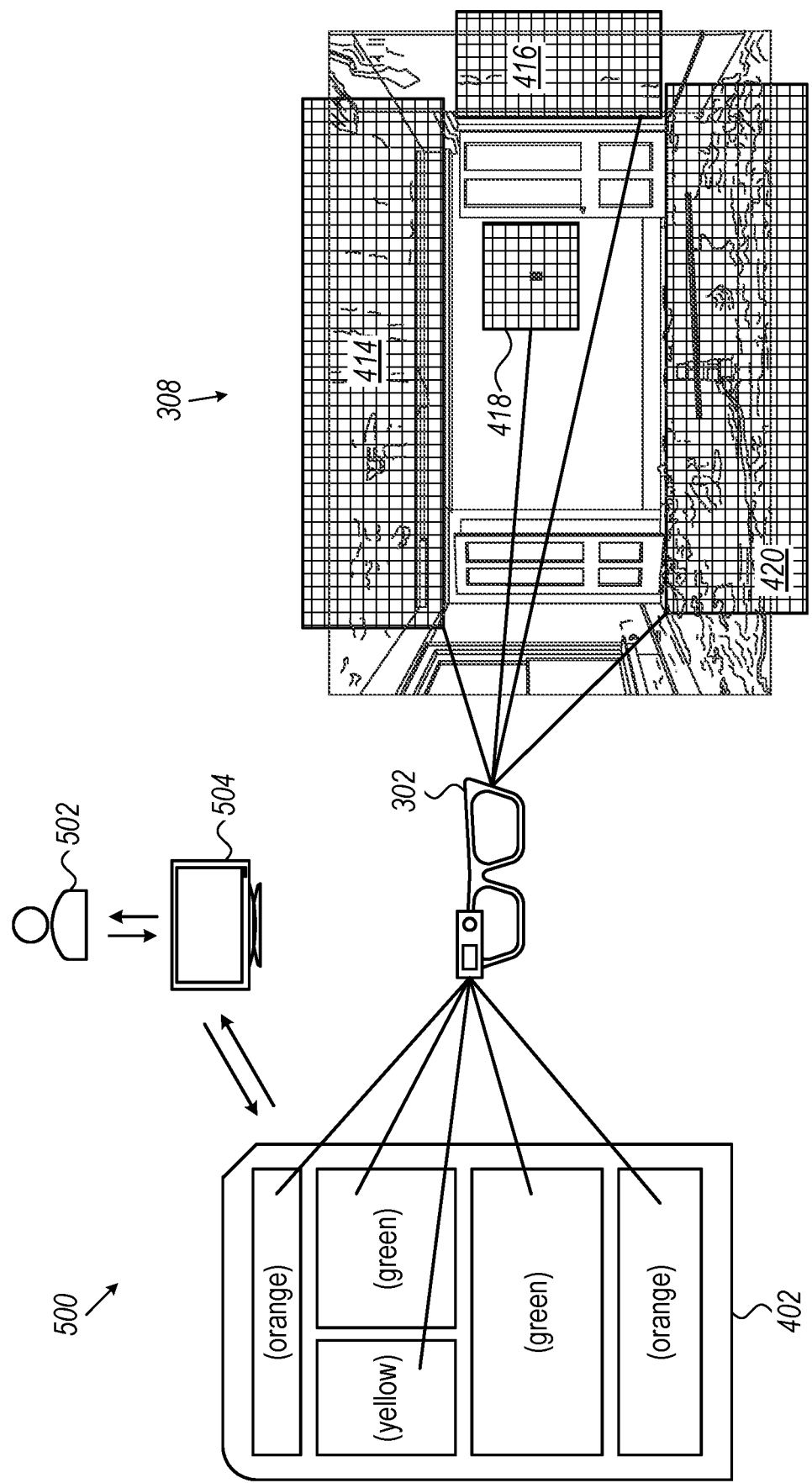
FIG. 5 is a validation scheme of an evaluation report template.

FIG. 5 depicts a validation scheme 500 of evaluation report template 402, in accordance with principles of the disclosure. Images 414, 416, 418, and 420 of each section of room 308 may be identified by smart glasses 302 and may be automatically mapped to one or more of report components 404, 406, 408, 410, and 412, all as described for the previous figure. Each section of the report may be shared in real time with remote user 502. Remote user 502 may be able to validate each section in real time by a smart contract linked to a blockchain network. Remote user 502 may be able to view the building on a remote display screen 504.

The on-site user of smart glasses and/or image capture apparatus 302 may be able to review each section of the building via an augmented reality screen. The screen may be associated with the glasses or image capture apparatus.

A remote display screen 504 may recapitulate view of an augmented reality apparatus associated with image capture apparatus of on-site user. The remote display screen 504 may display the status determination of each section of room 308. Remote user 502 may be able to input recommendations about each section via a remote user interface.

The augmented reality screen may display sections in a color-coded fashion that reflects the status of each section. The color coding may reflect whether the report for each section is considered complete.

Evaluation report template 402 may be visible to the on-site user in a color-coded fashion. Evaluation report template 402 may be visible to remote user 502 in a color-coded fashion. Room or area 308 of building may be visible to the on-site user in a color-coded fashion. Room or area 308 may be visible to remote user 502 in a color-coded fashion. Solely for exemplification, green may indicate that all needed data pertaining to section has been captured, Yellow may indicate that a portion of the needed data has been captured. Orange may indicate that no data has been captured yet. Color coding may be displayed on an augmented reality apparatus. Color coding may be displayed on a computer screen. Color coding may be displayed on a screen of a mobile computing device. Remote user 502 may supply guidance to on-site user, until all sections appear as green.

Figure 6:
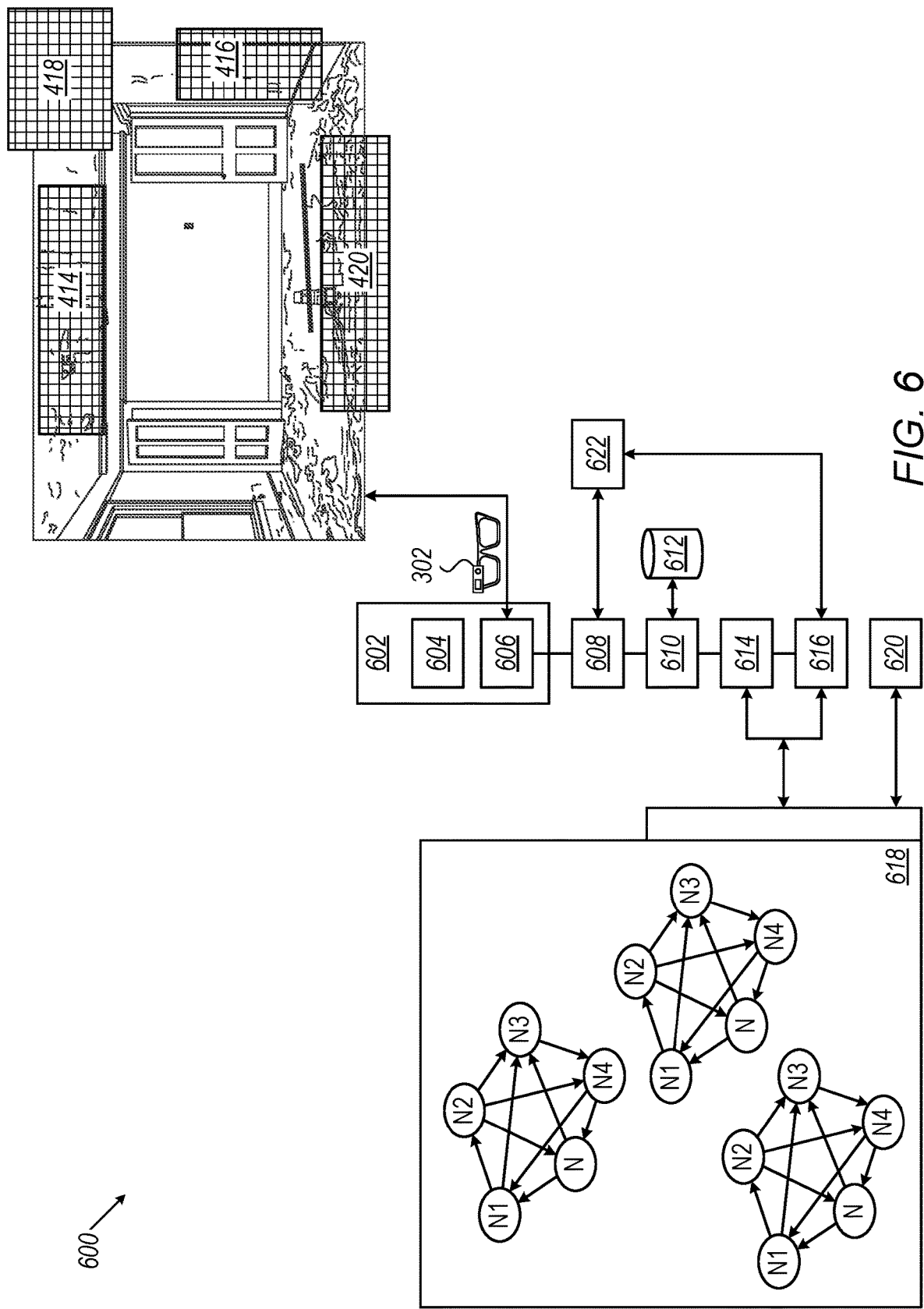
FIG. 6 depicts a system architecture of a building assessment system.

FIG. 6 depicts a representative system architecture 600 of a building assessment system, in accordance with principles of the disclosure. Smart glasses and/or image capture apparatus 302 may be associated with spatial computing module 602. Spatial computing module 602 may include geolocation module 604 and augmented reality module 606. Spatial computing module 602 may interface with image & voice analyzer module 608.

Image & voice analyzer module 608 may incorporate a deep learning generative AI model or algorithm 622. The algorithm may utilize a neural network. The neural network may include more than one layer. The neural network may include more than two layers. The network may be an LSTM network. The network may be a TGC-LSTM network. The network may have a transformer deep learning architecture. The architecture may utilize a parallel multi-head attention mechanism. The algorithm may be supervised. The algorithm may be semi-supervised. The algorithm may be unsupervised. The algorithm may utilize a knowledge graph. The algorithm may utilize knowledge graph-augmented machine learning.

Image & voice analyzer module 608 may interface with image annotation module 610. Image annotation module 610 may be governed by a database 612 of property evaluation rules.

Image annotation module 610 may feed data into report validation module 614.

Report validation module 614 may interface with report generation module 616. Report validation module 614 may receive draft report sections from report generation module 616. Report validation module 614 may review draft report sections received from report generation module 616 and indicate whether they are complete.

AI model or algorithm 610 may feed report section text to report generation module 616. Smart glasses and/or image capture apparatus 302 may feed images 414, 416, 418, and 420 to report generation module 616.

Report validation module 614 and report generation module 616 may share draft report sections with blockchain network/smart contract 618.

Blockchain network/smart contract 618 may utilize a collaborative orchestration module 620.

Figure 7:
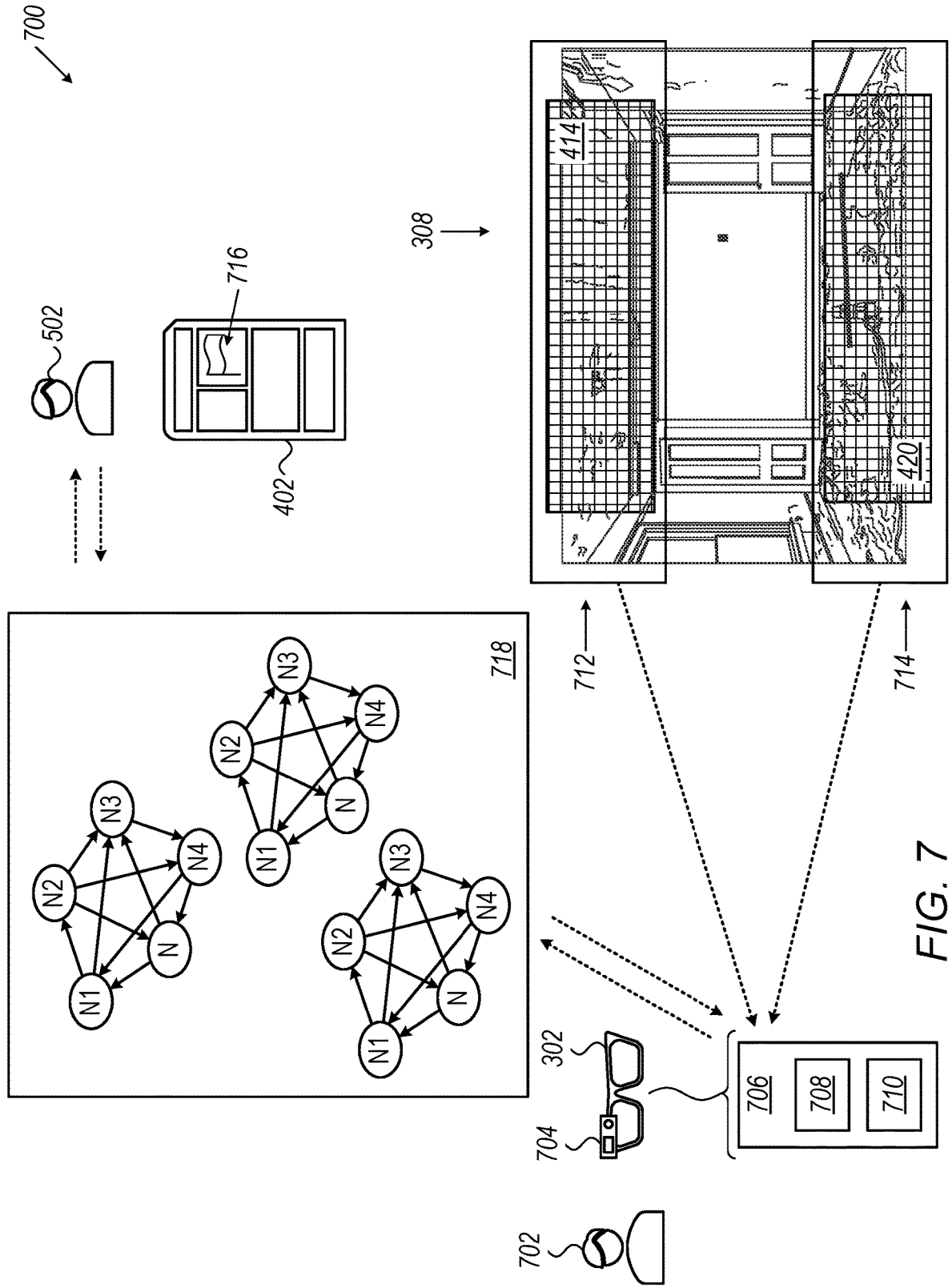
FIG. 7 is a diagram of system architecture and data flow of a building assessment method.

FIG. 7 is a diagram of system architecture and data flow 700 of a building assessment method, in accordance with principles of the disclosure. A wearable device 302 may be associated with an automated image capture apparatus 704 and may be facially mounted on an on-site operator 702. Wearable device 302 may contain a processor 706, which operates a spatial computing apparatus 708 and a machine learning model 710. Processor 706 may interface with a file-sharing platform 718.

The on-site operator 702 may use image capture apparatus 704 in conjunction with spatial computing apparatus 708 to capture and a plurality of images 414, 420 of a physical building 308 and localize the images within the building. The processor 706 and machine learning model 710 may analyze the images and identify a first section 712 and a second section 714 of the building. The first and second sections may each correspond to a structural feature of the physical building or a portion of the structural feature. Solely for exemplification, in the depicted case, section 712 corresponds to a ceiling, and section 714 corresponds to a floor. The captured images include a first image 414 of the first section 712 and a second image 420 of the second section 714.

The machine learning model may predict whether each of the identified sections comprises a defective characteristic. The machine learning model may generate a status identifier (not shown) for each section. The status identifiers may indicate whether a defective characteristic is believed to be present in that section.

The processor 706 may share the images and the status identifiers with a remote user 502, via a file-sharing platform 618. Remote user 502 may transmit feedback on the first and second sections to local operator 702. The feedback may include an indication of whether additional information is needed for each section.

In some cases, remote user 502 may determine that additional information is needed for a particular section(s). A draft report 402 may contain a virtual flag 716, indicating the report section is incomplete.

The local operator 702 may be prompted to capture additional (supplemental) image(s) of the incompletely characterized section. The additional images may be shared with remote user 502. Remote user 502 may again provide feedback on the flagged section(s). If sufficient information has been captured, the flag may be removed. If sufficient information has still not been captured, the flag may be retained.

Once all sections contain sufficient information, a report about the building may be generated. The report may include at least the image and the status identifier of each section.

Figure 8:
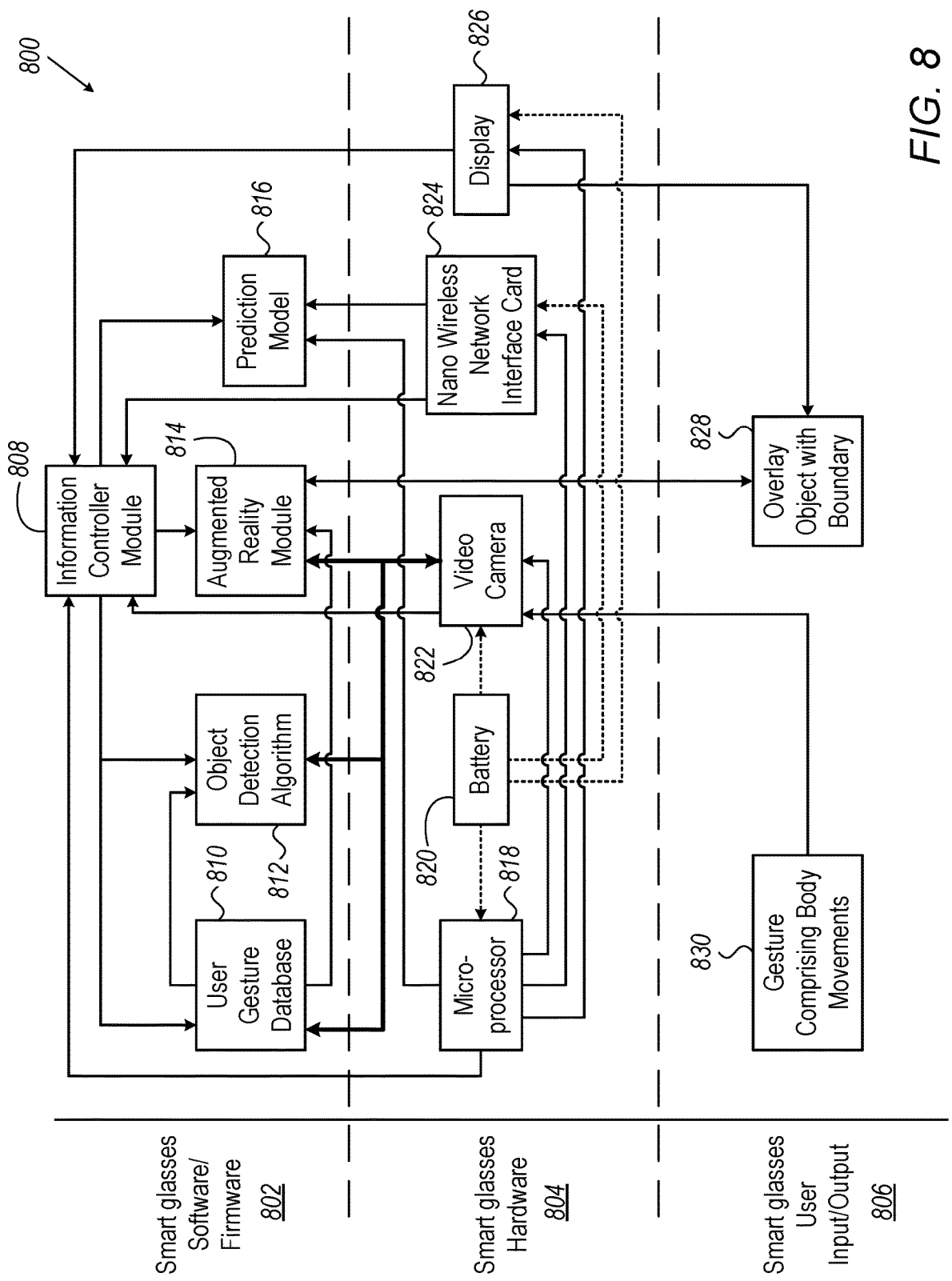
FIG. 8 shows exemplary apparatus and methods.

FIG. 8 shows exemplary apparatus 800 and methods in accordance with the invention. In FIG. 8, Smart Glasses Hardware 804, Smart Glasses Software/Firmware 802 and Smart Glasses User Input/Output 806 are illustrated, together with interrelationships between them. Additional connections between Smart Glasses Hardware 804 and Smart Glasses Software/Firmware 802 may be included in embodiments of the invention. In some embodiments, connections between Smart Glasses Hardware 804 and Smart Glasses Software/Firmware 802 may not be supported.

Smart Glasses Hardware 804 may include microprocessor 818, battery 820, video camera 822, nano wireless network interface card 824 and display 826. Smart Glasses Software/Firmware may include user gesture database 810, object detection algorithm 812, augmented reality module 814, prediction model 816 and information controller module 808.

Object detection algorithm 812 may detect objects in a frame captured by video camera 822. User gesture database 810 may be used to search a plurality of frames captured by video camera 822 to determine if a gesture comprising body movements was captured by video camera 822. User gesture database 810 may store a plurality of gestures, each gesture including different body movements. Each gesture may correspond to a different 'command' or 'input' being provided by the smart glasses user to the smart glasses. User gesture database 810 may be fed a gesture comprising body movements 830 captured by video camera 822. User gesture database 810 may correlate video data, such as a plurality of second frames, captured by video camera 822 with a gesture stored in user gesture database 810 using a prediction algorithm trained to identify the gesture. The training may include feeding a generic algorithm with a plurality of video data, each video data including the gesture, to create a prediction algorithm trained to identify the gesture.

Prediction model 816 may process frames, or part of frames (such as extracted objects) captured by video camera 822 to determine if the processed image includes one or more defective characteristics. Augmented reality module 814 may trigger the overlay object with boundary 828 with a boundary identified by object detection algorithm 812.

Microprocessor 818 may control information controller module 808. Information controller module 808 may control flows of information between user gesture database 810, object detection algorithm 812, augmented reality module 814 and prediction model 816. Information controller module may compile data packets for transfer to the remote server via nano wireless network interface card 824. In some embodiments, microprocessor 818 may directly control each of between user gesture database 810, object detection algorithm 812, augmented reality module 814 and prediction model 816 without information controller module 808.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will also be understood that some embodiments of the disclosure are described herein with reference to flowchart illustrations and/or block diagrams of systems, methods, and/or computer program products. Each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The ML engine may enter data outputted from an image capture apparatus into image classification algorithms, and it may be trained to use feedback from the remote users to collectively formulate and approve incremental learning adjustments with the regulated ML model. The regulated ML model and ML engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products for evaluating buildings are provided. Persons skilled in the art will appreciate that the present invention can be practiced by other than the described embodiments, which are presented for purposes of illustration rather than of limitation.

What is claimed is:

1. A method for evaluating a physical building, the method utilizing an automated image capture apparatus configured for being facially mounted on an operator, a spatial computing apparatus, a machine learning model, a file-sharing platform, a computer processor, and one or more non-transitory computer-readable media storing computer executable instructions; wherein the instructions, when executed by the computer processor, perform image analysis and run a machine learning model, the method comprising:

using the image capture apparatus in conjunction with the spatial computing apparatus, capturing a plurality of images of the physical building;
using the computer processor, analyzing the plurality of images;
identifying a first section and a second section of the physical building, wherein each of the first and second sections corresponds to a structural feature of the physical building or a portion of the structural feature, and wherein the plurality of images comprises a first image of the first section and a second image of the second section;
using the machine learning model, predicting whether each of the first and second sections comprises a defective characteristic;
generating a first status identifier for the first section and a second status identifier for the second section;
sharing the first and second images and the first and second status identifiers with a remote user;
transmitting feedback on the first and second sections from the remote user to the operator, wherein the feedback comprises indicating whether additional information is needed for the section;
for each section, as long as additional information is needed, iteratively:
  indicating a flagged status for the section;
  capturing a supplemental image of the flagged section;
  sharing the supplemental image with the remote user; and
  transmitting supplemental feedback from the remote user to the operator;
generating a report about the physical building, the report comprising at least the image and the status identifier of each of the first and second sections; and
if a defective characteristic is identified in the physical building, repairing the defective characteristic.

2. The method of claim 1, wherein the machine learning model performs identifying the first and second sections.

3. The method of claim 1, wherein the operator performs identifying the first and second sections.

4. The method of claim 1, wherein, the report further comprises the supplemental image of the first or second section.

5. The method of claim 1, wherein each of first and second status identifiers is selected from the group consisting of: comprises a defective characteristic, does not comprise a defective characteristic, and indeterminate status.

6. The method of claim 1, wherein, prior to generating the report, the remote user indicates whether additional sections of the physical building should be identified and inspected.

7. The method of claim 1, wherein, prior to generating the report, the machine learning model indicates whether additional sections of the physical building should be identified and inspected.

8. The method of claim 1, the method further comprising producing a voice feed, the voice feed indicating attributes of the physical building.

9. The method of claim 1, wherein the structural feature is selected from a floor, a ceiling, and a wall.

10. The method of claim 1, the method further comprising using a geolocation apparatus to verify the physical building's location.

11. The method of claim 1, the method further comprising, using an augmented reality apparatus, apprising the operator of the defective characteristic.

12. The method of claim 1, the method further comprising, using an augmented reality apparatus, overlaying the first and second status identifiers on a visual field of the operator.

13. The method of claim 1, wherein a generative machine learning algorithm automatically performs generating the report or a draft thereof.

14. The method of claim 13, wherein the generative machine learning algorithm utilizes the first and second images and the first and second status identifiers to generate the report or draft thereof in a section-by-section fashion.

15. The method of claim 14, the method further comprising the remote user reviewing the draft report.

16. The method of claim 15, wherein the file-sharing platform is a blockchain-based writing platform.

17. The method of claim 14, the method further comprising the operator reviewing the draft report.

18. The method of claim 1, wherein the remote user is a building engineer or property assessor.

19. The method of claim 1, the method further comprising utilizing a remote sensing method to assess a characteristic of the building.

20. The method of claim 19, wherein the remote sensing method is Light Detection and Ranging (LIDAR).

* * * * *